(12) United States Patent
Wernersson

(10) Patent No.: US 7,982,794 B2
(45) Date of Patent: *Jul. 19, 2011

(54) DIGITAL CAMERAS WITH TRIANGULATION AUTOFOCUS SYSTEMS AND RELATED METHODS

(75) Inventor: Mats Göran Henry Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 219 days.

This patent is subject to a terminal disclaimer.

(21) Appl. No.: 12/415,679

(22) Filed: Mar. 31, 2009

(65) Prior Publication Data

US 2009/0186655 A1 Jul. 23, 2009

Related U.S. Application Data

(63) Continuation of application No. 11/126,905, filed on May 11, 2005, now Pat. No. 7,538,813.

(51) Int. Cl.
 *H04N 5/232* (2006.01)
(52) U.S. Cl. ...................................................... 348/345
(58) Field of Classification Search .................. 348/345, 348/348, 208.99–208.5
 See application file for complete search history.

(56) References Cited

U.S. PATENT DOCUMENTS

| | | | |
|---|---|---|---|
| 5,121,154 A | 6/1992 | Yamada et al. | |
| 5,477,332 A | 12/1995 | Stone et al. | |
| 5,596,368 A | 1/1997 | Capper et al. | |
| 6,510,283 B1 | 1/2003 | Yamagishi | |
| 7,224,397 B2 | 5/2007 | Sasaki | |
| 7,277,118 B2 | 10/2007 | Foote | |
| 7,405,762 B2 * | 7/2008 | Nonaka et al. ................ 348/348 |
| 2003/0043290 A1 | 3/2003 | Sasaki | |
| 2004/0169734 A1 | 9/2004 | Umeyama | |
| 2004/0179129 A1 | 9/2004 | Okawara | |
| 2004/0245430 A1 | 12/2004 | Konishi | |
| 2005/0057673 A1 | 3/2005 | Shimomura et al. | |
| 2005/0206738 A1 | 9/2005 | Kumaki et al. | |

FOREIGN PATENT DOCUMENTS

| | | |
|---|---|---|
| GB | 2376592 | 12/2002 |
| JP | 4117777 A | 4/1992 |
| JP | 2002296490 | 10/2002 |

OTHER PUBLICATIONS

International Search Report and Invitation to Pay Additional Fees, dated May 3, 2006 for related PCT application No. PCT/EP2006/062011.

International Search Report and the Written Opinion, dated Dec. 20, 2006 for related PCT application No. PCT/EP2006/062011.

Ertürk, S., Digital Image Stabilization with Sub-Image Phase Correlation Based Global Motion Estimation, IEEE Transactions on customer Electronics, vol. 49, No. 4, Nov. 2003, pp. 1320-1325.

* cited by examiner

*Primary Examiner* — Tuan Ho

(74) *Attorney, Agent, or Firm* — Myers Bigel Sibley & Sajovec, P.A.

(57) ABSTRACT

Digital cameras with triangulation auto focus systems include a spot beam emitter than can be used to project a spot onto a subject that is captured in an image and used to electronically automatically determine a subject to camera distance.

21 Claims, 17 Drawing Sheets

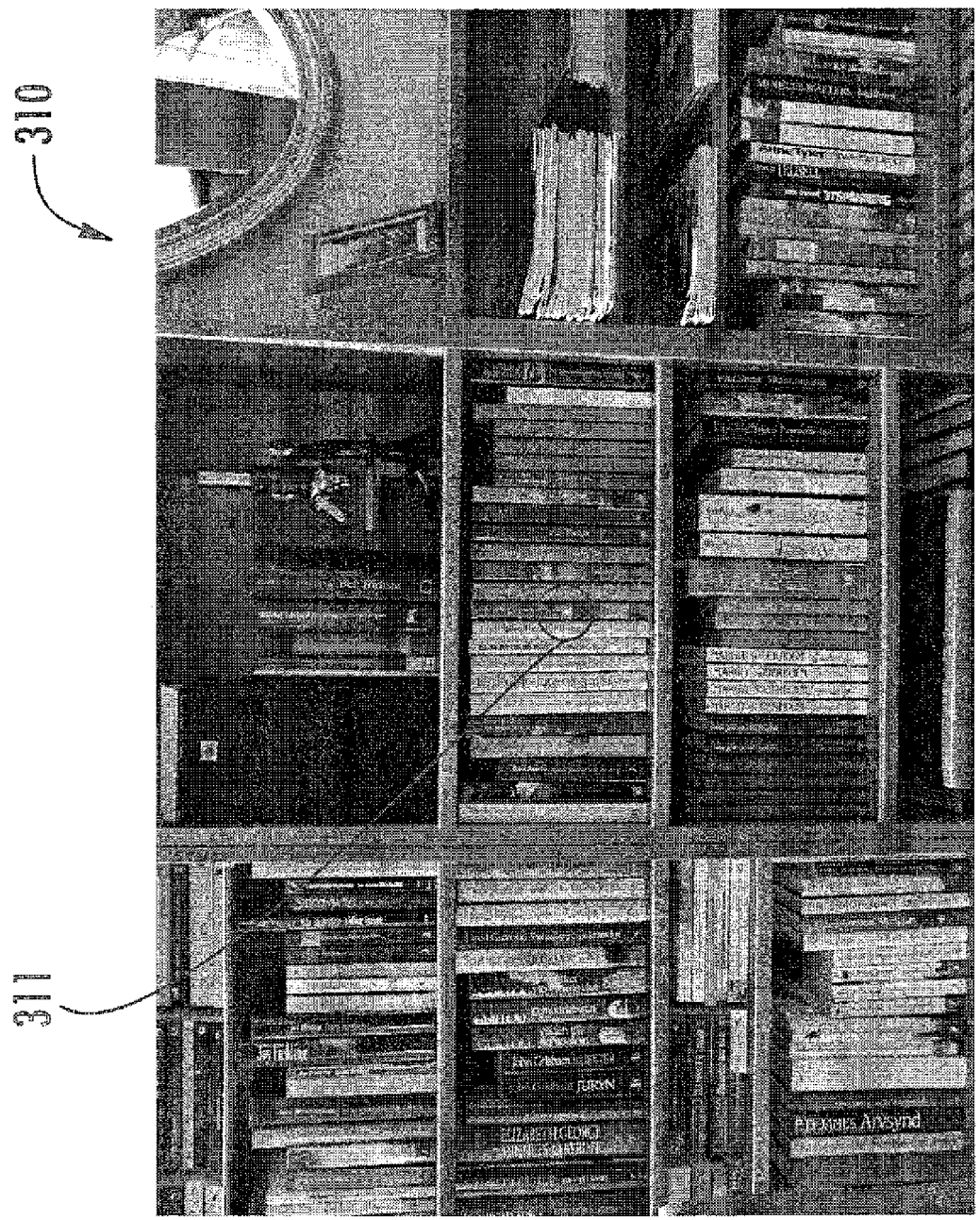

```
/* Image files are assumed to store pixel data in the order
RED, GREEN, BLUE
The variables row_max and column_max will hold the
position of the spot */ void FindSpot (unsigned char* spot_image,
               unsigned char* ref_image,
               int no_of_columns,
               int no_of_rows,
               int *row_max,
               int *column_max)
{
int srcPosition;
int blue_pixel, red_pixel;
unsigned char pixel, max = 0;
*row_max = 0;
*column_max = 0;
int row, column;

for (row = 0; row < no_of_rows; row++)
{
    srcPosition = row * no_of_columns;

for (column = 0; column < no_of_columns; column++, srcPosition += 3)
    {
        blue_pixel = spot_image [srcPosition + 2] - ref_image[srcPosition + 2];

red_pixel = spot_image [srcPosition] - ref_image[srcPosition];

red_pixel -= blue_pixel;

if (red_pixel < 0)
            red_pixel = 0;

pixel = unsigned char(red_pixel);

if (pixel > max)
        {
            max = pixel;
            *row_max = row;
            *column_max = column;
        }
    }
}
}
```

FIG. 14

DIGITAL CAMERAS WITH TRIANGULATION AUTOFOCUS SYSTEMS AND RELATED METHODS

RELATED APPLICATION

This application is a continuation of U.S. patent application Ser. No. 11/126,905, filed May 11, 2005 now U.S. Pat. No. 7,538,813, the contents of which are hereby incorporated by reference as if recited in full herein.

FIELD OF THE INVENTION

The present invention generally relates to digital camera devices, and may be particularly suitable for mobile electronic devices that include a digital camera.

BACKGROUND OF THE INVENTION

Many digital still image and video cameras employ a passive type auto focus system that measures the contrast of image content. Generally described, when comparing a sharp image with a blurred image, rendered on the same scene, the sharp image contains more information from high spatial frequencies. There are more transitions between dark and bright areas and the difference between the dark and bright areas is greater. Assessing the contrast of image content between images can give a relative measure of sharpness. A conventional contrast-based auto focus system includes a camera lens, a focusing means for changing the position of the lens, an imaging sensor and a digital signal processor (DSP). The lens is configured to move to different discrete focusing positions, each corresponding to a particular subject-to-camera distance. In operation, the system moves the lens to a number of different positions during the auto focusing process. An image is captured at each position and a relative sharpness value can be determined for each image. The system then moves the lens to the position that produced the image having the greatest sharpness value.

A typical mobile phone digital camera uses the image contrast technique for auto-focusing. The mobile phone camera may cover a focusing distance of from about 10 cm to infinity by using a resolution accomplished by between 10-20 focusing steps. Such a mobile phone camera may have a 2 million pixel sensor and a fixed focal length lens with an aperture f1:2.8. This type of camera may produce about 15-30 images every second in daylight or bright artificial light. It is believed that the auto focus actions for an image using these devices is relatively slow can take about 1-2 seconds to perform.

Sub-sampling can be used to shorten this time. In the sub-sampling method, the lens does not move to every discrete location during the search process. The sharpness values can be interpolated to produce an estimation of sharpness for the positions between those actually sampled.

Unfortunately, while sub-sampling may shorten the auto focus time, a degradation in precision may be introduced. In addition, the time it takes to focus is still relatively long, typically about 1 second. This may make it difficult to achieve a good tracking auto focus for video recording using the sub-sampling technique. For example, when the main subject is moving closer or farther away from the camera, the system can indicate that the sharpness has changed. However, it is difficult to determine how much the subject has moved and/or in which direction. Some relatively sophisticated and precise (relatively expensive) video systems may address this problem by "hunting" the lens back and forth in very small steps.

There remains a need to provide alternative economic auto focus systems for digital cameras with still and/or video recording capability.

SUMMARY OF EMBODIMENTS OF THE INVENTION

Some embodiments of the present invention provide digital cameras with triangulation auto focus systems. Certain embodiments of the present invention provide mobile communication devices incorporating digital cameras that have triangulation auto focus systems.

Some further embodiments of the present invention are directed to methods of auto-focusing a digital camera in still image and/or video recording mode. The methods include: (a) projecting at least one light spot toward a target subject; (b) capturing a first image of the target subject having the at least one light spot in response to the projecting step; (c) programmatically determining a distance of the target subject from the digital camera using the image with the light spot; and (d) automatically focusing a digital camera lens based on the determining step. In some embodiments, the methods can include: capturing a second image of a target subject devoid of an emitted light spot proximate in time to the capturing of the first image; electronically comparing a region of interest in the first and second images to determine positional data associated with the light spot in the first image; and electronically calculating the distance of the target subject from the camera based on the determined positional data. The first and second images can be captured using the same exposure setting and the same white balance setting.

The methods can be carried out so that the first and second images are captured within less than about 0.10 seconds of each other. In some embodiments, where the frame rate is between about 15-30 fps, the automatically focusing step can be carried out in the range of about 0.033-0.067 seconds. For increased frame rate speeds, the delay between the captured images may be smaller than 0.033 seconds.

The methods can include auto focusing during video recording by monitoring sequentially generated projected light spots in images; and electronically removing the light spots from image data in the video recording spot images.

In some embodiments the methods can include automatically stabilizing the focus of a moving subject in a still image using the captured spot image. The projecting step may include emitting light from a light source in a visible part of a light spectrum.

In some embodiments, the capturing step can include capturing an image signal using a digital camera sensor that is configured to integrate the signal by detecting photons during image exposure time.

In some embodiments, the projecting at least one spot is carried out by substantially concurrently projecting a plurality of discrete spatially separate spots. The methods can also include calculating a plurality of subject to spot distances, one distance for each of the plurality of separate spots. The automatically focusing step can use the spot calculated as having a closest subject to camera distance to establish a focal distance for an image.

In some embodiments, the methods can include automatically electronically registering the region of interest in the first and second images to thereby provide image stabilization.

Some further embodiments of the present invention are directed to methods of providing motion image stabilization in images generated by a mobile electronic communications device with a digital camera. The methods include: (a) electronically capturing a reference image; (b) electronically capturing a target image with at least one spot image region; (c) automatically mathematically transforming at least the spot image region of the target image by comparing at least a portion of the target image containing the spot image region to a corresponding region in the reference image; and (d) generating a motion-stabilized image based on data from the mathematic transformation.

In some embodiments, the reference and target images can be captured within less than about 0.10 seconds of each other (typically within about 0.033-0.067 seconds of each other). The methods may include: registering the target and reference images based on data from the mathematic transformation; subtracting corresponding pixel values from the aligned target and reference images to provide a difference image; and determining the spot location based on the difference image. In some particular embodiments, the subtracting corresponding pixel values step comprises separately accounting for different color pixel values in the corresponding pixels.

Further embodiments of the present invention provide digital cameras configured with a triangulation auto focus system.

In some embodiments, the digital camera with the triangulation auto focus system forms part of a portable electronic communications device.

In some embodiments, the digital camera includes a spot beam emitter and a camera lens disposed proximate the spot beam emitter, the spot beam emitter being configured to project at least one spot onto a target subject that is able to be captured in a digital image of the target subject taken by the camera. The spot beam emitter may be configured to project a light(s) that is in a visible part of the light spectrum.

The digital camera may include a camera image sensor in communication with the camera lens, the camera image sensor being configured to act as a receiver in the triangulation auto focus system.

In some embodiments, the digital camera can include a digital camera image sensor configured to communicate with the spot beam emitter and/or an automatic exposure control circuit in communication with the spot beam emitter to control the duration and/or intensity of the projected spot.

The digital camera may include a collimating lens in the light transmission path configured to collimate the light from the spot beam emitter In some embodiments, the digital camera spot beam emitter is configured to generate a plurality of spatially separate spots onto a subject that is captured in the image.

In certain embodiments, the digital camera can include one or more of the following: a transparent diffraction grating, a cylindrical lens or a holographic diffraction grating, in communication with the spot beam emitter to substantially concurrently generate multiple spots in the image.

The digital camera can include a spot beam emitter that is configured to operate with a spot beam pulse having a spot duration of about 1 ms or less.

In some embodiments, the digital camera may further include a contrast auto focus system. The digital camera may include a light intensity control circuit in communication with the spot beam emitter. The digital camera spot beam emitter may include a laser and the camera can include a pulse control circuit. The digital camera may include an automatic exposure control used to time a duration of the projected spot and to monitor a brightness of a target image subject.

The digital camera may include a control circuit that is configured to selectively operate the camera in a still image camera mode and in a video recording mode. The control circuit may be configured to control emission of a spot beam pulse during the still image and video recording modes, and the control circuit may be configured to prevent emission of the spot beam pulse during acquisition of selected images.

The digital camera device may be configured to electronically automatically compare a region of interest between electronically stored sequential first and second images to determine positional data associated with a light spot generated by the spot beam emitter, then electronically automatically calculate a distance of the target subject from the camera based on the determined positional data and adjust the position of the lens to the proper focal position based on the calculated distance.

The digital camera device may be configured to automatically electronically register and/or align a region of interest in the first and second images to thereby provide motion image stabilization in a still image.

In particular embodiments, the digital camera is held in a portable electronic communications device. The digital camera can include a spot beam emitter configured to project a spot onto a target subject having a time duration and intensity sufficient to allow the spot to be captured in a digital image of the target subject.

Other embodiments are directed toward computer program products for operating a triangulation auto focus system in a digital camera. The computer program product includes a computer readable storage medium having computer readable program code embodied in the medium. The computer-readable program code includes: (a) computer readable program code that controllably operates a spot beam emitter to provide a spot that is visible in a captured digital image; and (b) computer readable program code that calculates a subject to camera distance using a determined spot distance of a spot from the spot beam emitter in the captured digital image.

The computer program product may also include computer readable program code that automatically electronically registers and/or aligns a region of interest between sequentially temporally proximate first and second images to thereby provide motion image stabilization in a still image.

Still other embodiments are directed to portable communications device with a digital camera comprising an auto focus system that is configured to measure distance between a target subject and the camera using view finder image data and automatically move a camera lens to a focus position based on the measured distance.

BRIEF DESCRIPTION OF THE DRAWINGS

Other features of the present invention will be more readily understood from the following detailed description of specific embodiments thereof when read in conjunction with the accompanying drawings, in which:

FIG. 10A is a digital reference image of a target subject and FIG. 10B is a spot image of the target subject, the images taken sequentially in time according to embodiments of the present invention.

FIG. 14 is an example of source code that may be used to programmatically carry out image analysis calculations for evaluating the spot(s) position with image registration according to embodiments of the present invention.

DETAILED DESCRIPTION OF EMBODIMENTS OF THE INVENTION

Figure 1:
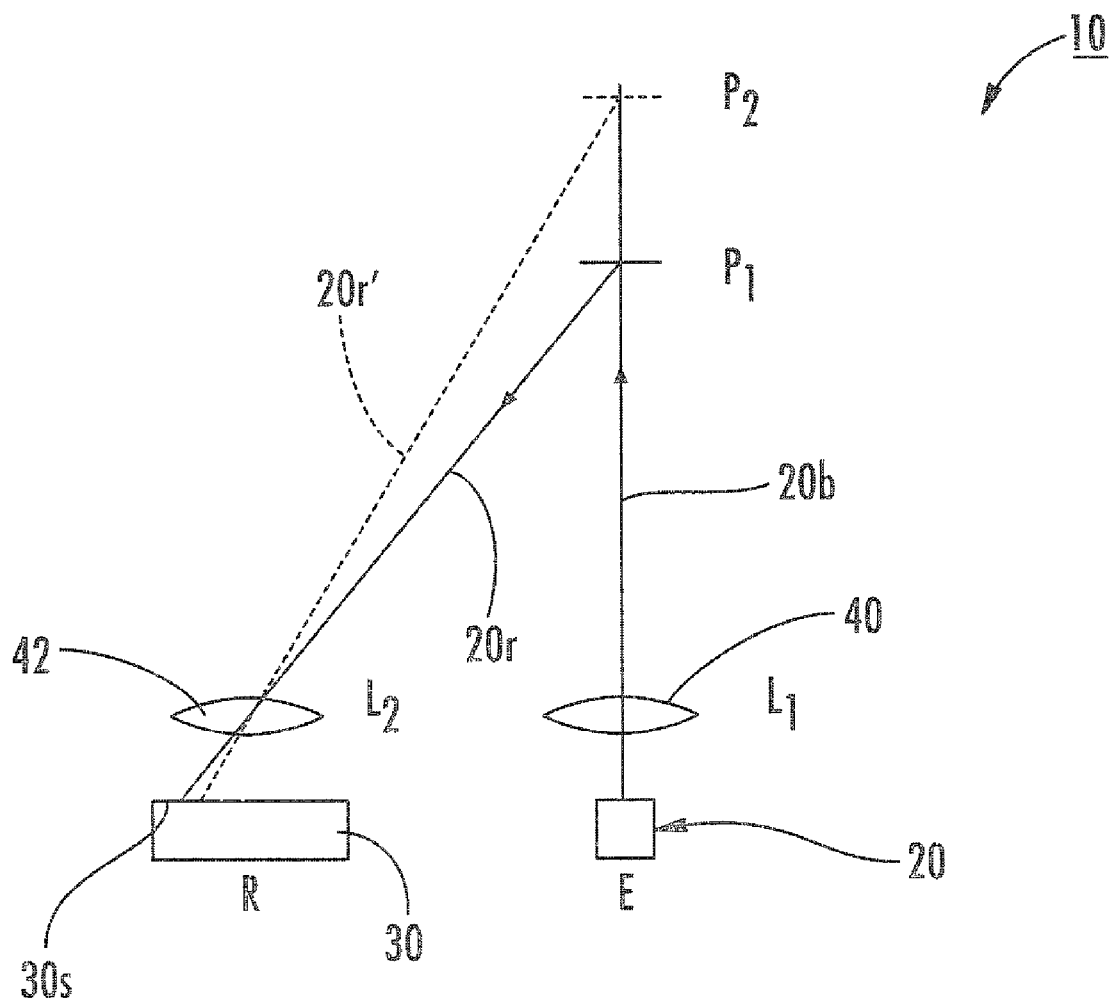
FIG. 1 is a schematic illustration of a triangulation auto focus system in accordance with various embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the claims or figures unless specifically indicated otherwise. Where used, the terms "attached", "connected", "contacting", "coupling" and the like, can mean either directly or indirectly, unless stated otherwise.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise.

It also will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items. It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this application and the relevant art and should not be interpreted in an idealized or overly formal sense unless expressly so defined herein.

The term "electronic" means that the system, operation or device can communicate using any suitable electronic media and typically employs programmatically controlling the communication, interface protocol, timing and data exchange, and the like, between components of a digital camera with an auto focus system. The term "automatic" means that substantially all or all of the operations so described can be carried out without requiring active manual input of a human operator, and typically means that the operation(s) can be programmatically electronically directed and/or carried out.

The term mobile electronic (communication) devices includes portable radio communication equipment which can be describe a mobile radio terminal and includes all such equipment such as, for example, mobile telephones, pages, communicators, electronic organizers, smartphones, hand held, laptop, or palm computers, personal digital assistants, and the like.

The term "triangulation auto focus system" means an auto focus system that employs an active type of auto focusing that calculates a measure of distance between the camera and the subject rather than analyzing relative sharpness by comparing multiple images. The triangulation auto focus system can project an emitted ray(s) of radiation from a light source integral to the camera toward the target subject. The projected light spot or spots can be detected in a digital image (typically in relatively low resolution viewfinder image data) of the subject as reflected light. The term "spot" means a small, localized region zone of an image that is due to the captured emitted ray(s) of radiation from the projected light spot. The spot can be any suitable shape, including a strip or line, and can be sized to be detectable in the digital image using the resolution of the camera. In some embodiments, the spot can be between about 1-5 pixels, and in some particular embodiments, may be a sub-pixel size. As will be discussed below, in some embodiments the digital camera can be configured to generate multiple spots, one or more of which can be used to determine the proper focal distance for the target subject.

Embodiments of the present invention can be used with any desired resolution (higher resolution providing more detail). A typical standard size/resolution for digital cameras, images (files), and displays is VGA (Video Graphics Array). VGA size is 640 pixels wide by 480 pixels tall (or vice-versa in portrait orientation). VGA has greater resolution than CIF, QCIF, and QVGA, but smaller than SVGA, XGA, and megapixel. In particular embodiments, such as for compact mobile phones, the digital cameras can be configured to provide QVGA (Quarter-VGA) having about 320 pixels by 240 pixels which is larger (higher resolution) than QCIF, but smaller than VGA.

As will be appreciated by one of skill in the art, embodiments of the invention may be embodied as a method, system, data processing system, or computer program product. Accordingly, the present invention may take the form of an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic or other electronic storage devices.

Computer program code for carrying out operations of the present invention may be written in an object oriented programming language such as Java, Smalltalk or C++. However, the computer program code for carrying out operations of the present invention may also be written in conventional procedural programming languages, such as the "C" programming language or in a visually oriented programming environment, such as VisualBasic.

The invention is described in part below with reference to flowchart illustrations and/or block diagrams of methods, systems, computer program products and data and/or system architecture structures according to embodiments of the invention. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory or storage that can direct a computer or other programmable data processing apparatus to function in a particular manner, such that the instructions stored in the computer-readable memory or storage produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Turning now to the figures, FIG. 1 illustrates a triangulation auto focus (AF) operational principle. The letters $P_1$, $P_2$ refer to subject positions. The AF system 10 includes a spot beam emitter 20 that projects the light beam 20b toward the target subject ($P_1$ or $P_2$). The spot beam emitter 20 can comprise an LED (light emitting diode), laser or other suitable light source. In some embodiments, the spot beam emitter 20 can operate in the visible portion of the light spectrum. In other embodiments, the spot beam emitter 20 can be configured to emit light that is in part of the light spectrum that is invisible to the eye. Combinations of these types of emitted light may also be used. A camera sensor can then be used as the receiver 30 (as will be discussed further below).

The position of the spot image on the receiver surface 30s shifts as a function of subject distance as shown by the alternate position $P_2$ and associated reflected beam 20r'. The incoming receiver signal varies depending on the position of the spot image. Spot position data can be extracted from the receive signal. Examples of some spot position detection methods that have been used in the past for other applications include solid state positioning sensing device (PSD), a slanted arrangement of dual photo diodes, a mechanically scanning photo diode, a mechanically scanning LED, and a mechanically scanning obstruction device.

As shown in FIG. 1, the system 10 may include aspheric lenses, such as a collimating lens 40. The collimated light generates a projected light on the subject. The system 10 can include a second lens 42 that projects an image of the subject on the surface of the receiver 30.

The spot signal should be isolated from signals originating from sources other than the spot beam emitter 20. For LED spot beam emitters 20 and certain types of receivers 30, the reflected infrared radiation may be isolated by modulating the LED pulse with a certain frequency. The signal from the receiver 30 can then be filtered electronically to suppress or remove unwanted or irrelevant signals.

Figure 2A:
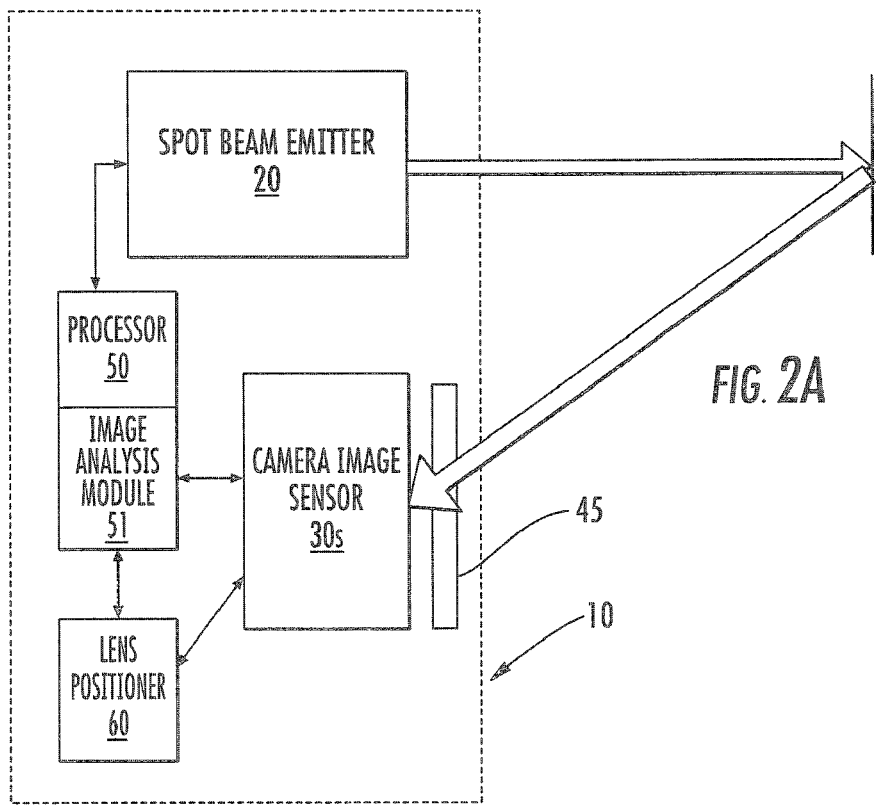
FIG. 2A is a schematic illustration of a digital camera with an auto focus system with a spot beam emitter according to embodiments of the present invention.
Figure 2B:
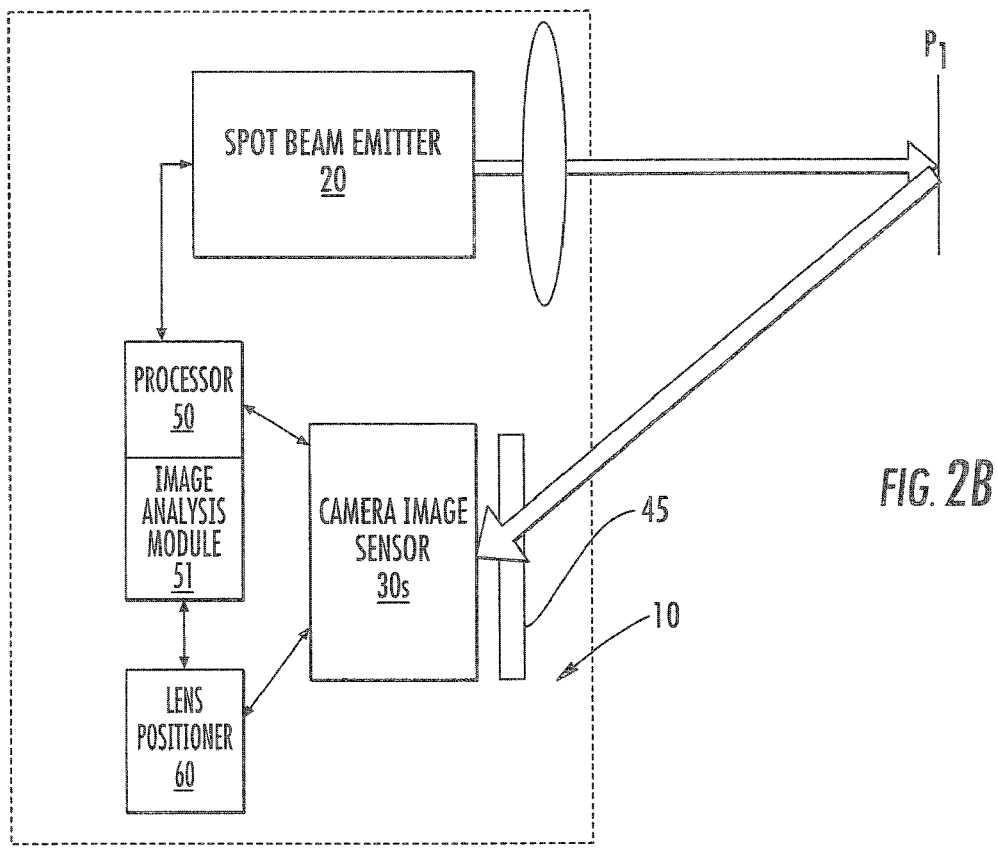
FIG. 2B is a schematic illustration of a digital camera with an auto focus system having a collimating lens in communication with a spot beam emitter according to embodiments of the present invention.

As shown in FIGS. 2A and 2B, in some embodiments, a camera sensor 30s can be used as the receiver 30. The system 10 can also include a camera lens 45 and a processor (such as a digital signal processor) with an image analysis module 50 and a lens positioner module 60 that define the subject to camera distance and automatically electronically move the lens to the proper focal position. The lens 45 can be configured to move to different discrete positions (such as for zone focusing) or continuous movement. As is known to those of skill in the art, instead of capturing a photograph on film, as in earlier cameras, a digital camera, including those in a cameraphone, records the picture using a sensor, a light-sensitive integrated circuit. The sensor is typically one of two main types, and these are known by the technology they use: either a CCD (charge-coupled device), which uses an array of capacitors, or a CMOS (complementary metal-oxide-semiconductor) device, which uses transistors. Whatever the type of sensor fitted, the principle of operation is generally the same: the light that passes through the lens falls onto the sensor, which contains many individual light-sensitive cells, and each cell reacts to a particular point of light coming from the scene that is to be photographed. The effect of the incoming light is to cause tiny changes in the individual cells of the sensor, creating a pattern that mirrors the image, and these changes are then converted into electrical signals. The electrical output from the sensor is next put through several stages of processing, so that the image of the photographed scene can be reproduced on the viewfinder, or it may be stored in the phone's memory for later use.

The sensor 30s may note be sufficiently sensitive to infrared radiation, so the spot beam emitter 20 can be configured to generate light that is in a visible part of the light spectrum. The spot image data captured by the camera sensor 30s can be processed to identify the location of the spot in the image.

In some embodiments, two sequential images can be compared to determine the spot positional data. One of the images can be the spot image and the other can be a "normal" image with the beam spot emitter being inactive, with the normal image being devoid of a spot in the image. The two images can be taken in any desired order (spot image first or second) and are generally taken relatively quickly within less than about 0.10 seconds of each other. A typical digital camera can operate at about 15-30 frames/second and the two images can be captured within about 0.033-0.067 of each other. To facilitate comparison of the images, the exposure and white balance may be locked at the same level for the two images.

Only a relatively small portion of the images, the portions in the region of interest where the spot can be present need to be compared (saving on image processing time). The autofocusing can be carried out relatively quickly in less than about 0.5 seconds, typically in less than about 0.25 seconds, even in total darkness.

Figure 3A:
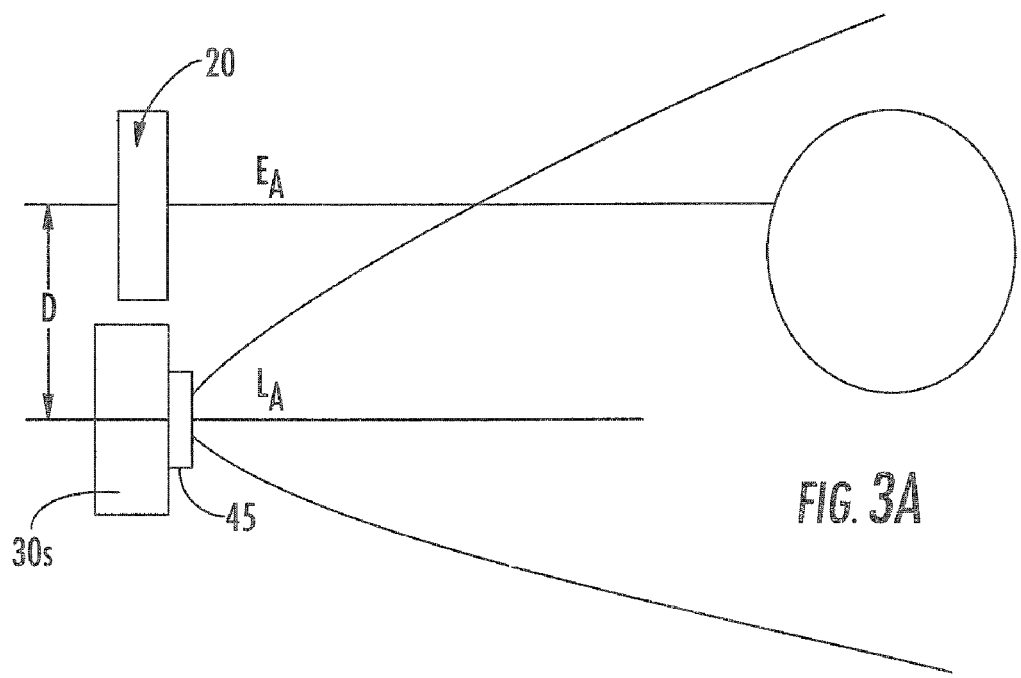
FIG. 3A is a schematic illustration of a digital camera with an auto focus system using a spot beam emitter that projects a light spot onto a target subject and a camera lens being configured to capture an image of the subject with the light spot according to embodiments of the present invention.

FIG. 3A illustrates that that the lens axis $L_A$ and the emitter axis $E_A$ can be substantially parallel. In some embodiments the distance between the two "D" axes can be less than about 3 cm, typically less than about 1 cm. The spot beam emitter 20 can be located proximate the lens, and is typically located above or below the lens 45 as shown in FIGS. 4A and 4B (or both above and below where multiple spot beam emitters are used—not shown).

Typical mobile phone cameras have focal lengths of about 5 mm and an aperture of f1:2.8, distance information may only be desired where the subject is located at about 2.7 meters or closer to the camera 10. That is, there may not be a detectable spot signal when the distance to subject is long. The lens can be focused on the hyper focal distance in these situations. Alternatively, the camera 10 may include both a contrast AF system and the triangulation system and may (automatically) employ the contrast AF system above defined distances. Because contrast AF systems do not require additional hardware, the cost of providing both types of systems is relatively low.

Figure 4A:
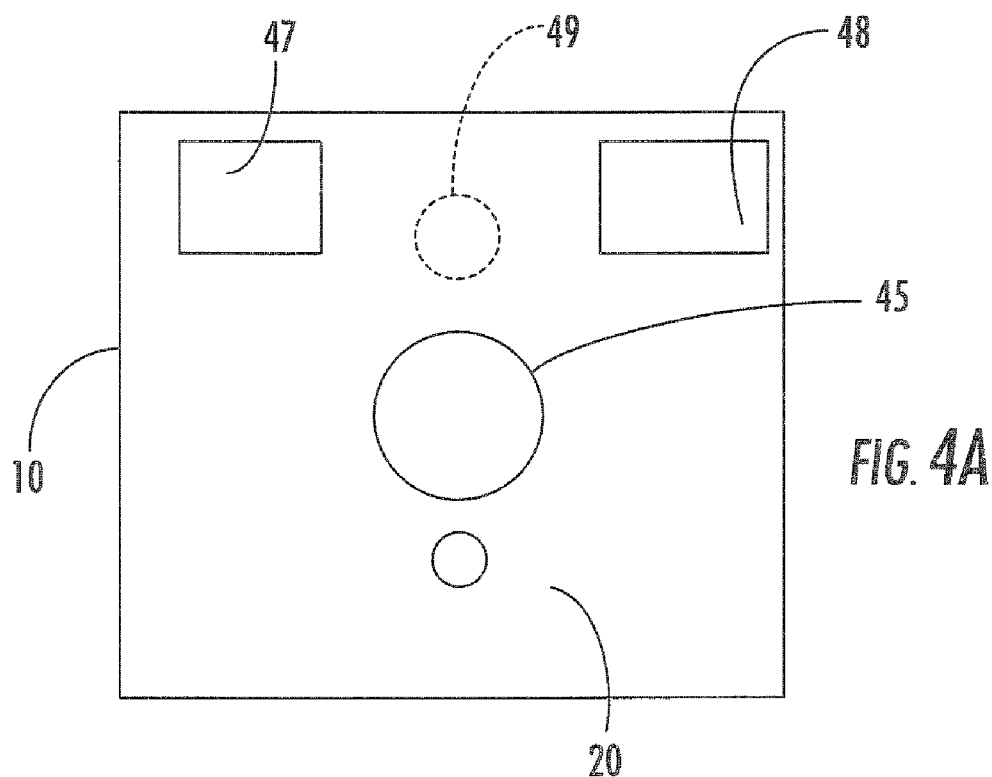
FIGS. 4A and 4B are front views of exemplary digital cameras according to embodiments of the present invention.
Figure 4B:
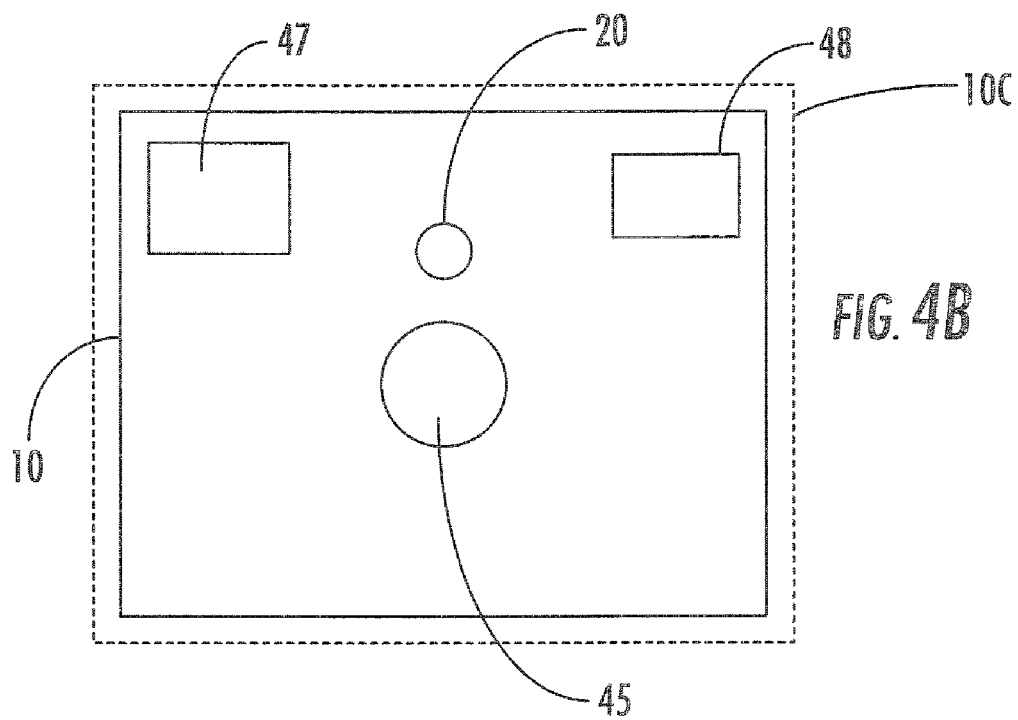

FIGS. 4A and 4B illustrate that the camera 10 can include a view finder 47 and may optionally also include a flash (such as a xenon flash) and/or a light sensor 49 and accompanying flash control circuit for facilitating exposure (brightness) control. The camera 10 can have an automatic exposure control that uses the light sensor 49 to generate information on the subject's brightness. The information can also be used to time the duration and/or intensity of the spot beam. In other embodiments, a predetermined intensity can be set for operative use. Alternatively, the camera 10 can include a user adjustable intensity setting. It is also noted that it may be possible to omit the light sensor 49 because the distance information from the AF system provided by the instant invention can be used as a basis for exposure control during flash lighting images. FIG. 4B also illustrates that the camera 10 can be included in a portable communications device 10c.

Figure 5A:
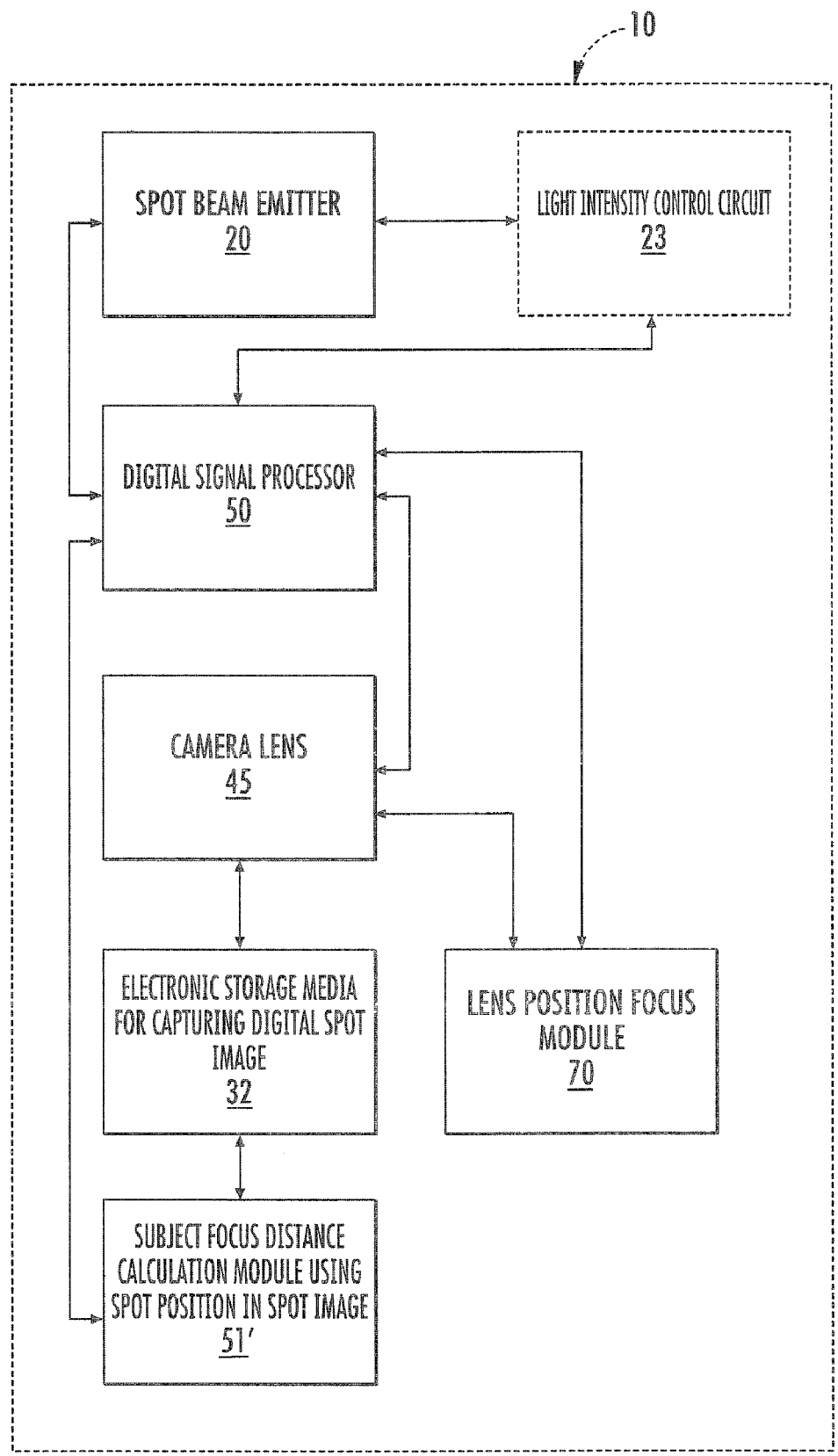
FIG. 5A is a block diagram of components of an auto focus system for a digital camera according to embodiments of the present invention.

FIG. 5A illustrates components of a digital camera 10. As shown, the spot beam emitter 20 can optionally be in communication with a light intensity control circuit 23 to control and/or adjust the intensity of the spot beam. In any event, the camera 10 can employ a circuit 23 to control the intensity and or time duration of the beam projected by the beam spot emitter 20. For example, where the camera deploys a flash, the spot beam emitter 20 may employ a more intense spot beam 20r. When the camera circuit 23 detects a non-flash (non full sun) picture, the spot beam emitter 20 may generate a less intense beam.

FIG. 5A also illustrates that the camera lens 45 is in communication with an electronic storage media for capturing the digital spot image 32 and a subject focus distance calculation module using the spot position in the spot image 51'. The distance calculation module 51' can be configured as part of the image processing module 51 shown in FIGS. 2A and 2B. The camera 10 also includes a lens position focus module 70 with a means for automatically moving the lens 45 to the proper focus position as is well known to those of skill in the art. The camera 10 can also include an amplification system for amplifying the received signal (not shown).

Turning back to FIG. 3A, as discussed above, the spot beam emitter 20 can comprise an LED typically with a collimating lens 40 (FIG. 1) or laser. The camera 10 can include an electronic circuit for driving the LED (not shown). A laser (such as a solid state laser) may be used for focusing at longer distances because it can operate at a higher light power and project a well-defined spot in the image, even at longer distances.

Figure 3B:
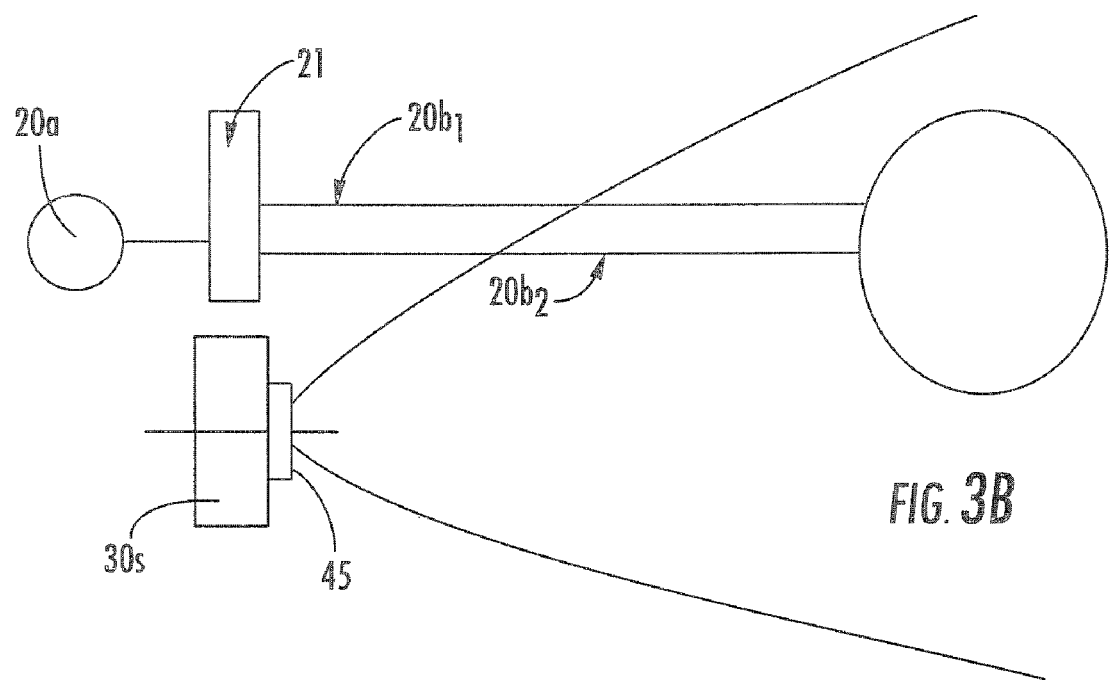
FIG. 3B is a schematic illustration of a digital camera with an auto focus system configured to substantially concurrently generate a plurality of projected light spots that can be captured in a digital image.

In some embodiments, as illustrated in FIG. 3B, the system 10 can be configured to generate a plurality of discrete spots using a plurality of projected beams, $20b_1$, $20b_2$. The plurality of spots can provide a broader AF area. The multiple spots can be generated in several manners. For example, discrete spot beam emitters as noted above. Alternatively, a single beam spot emitter, such as a laser 20a, can be in communication with an optic system 21 that splits the beam into discrete rays. The optic system 21 can include a transparent diffraction grating that can generate spot beams that diverge and generate spot images with a constant separation in the receiver's image independent of subject distance. Another example of an optic system 21 is a cylindrical lens and/or holographic diffraction grating that that can produce a horizontal line image. The multiple spots can be generally aligned in the spot image (in a row and/or column), typically relatively centered about the center of the image.

For certain spot beam emitters 20 employing lasers, it may be desirable to keep laser power low, typically in the range of about laser pointers and to make the duration of the laser pulse short, such as less than about 2 milliseconds, typically less than about 1 millisecond, to control the exposure to a subject's eye(s). The laser pulse can be timed and configured to be sufficiently short and with low energy so as to reduce the likelihood that the camera 10 may need laser notice or warning labeling.

Figure 5B:
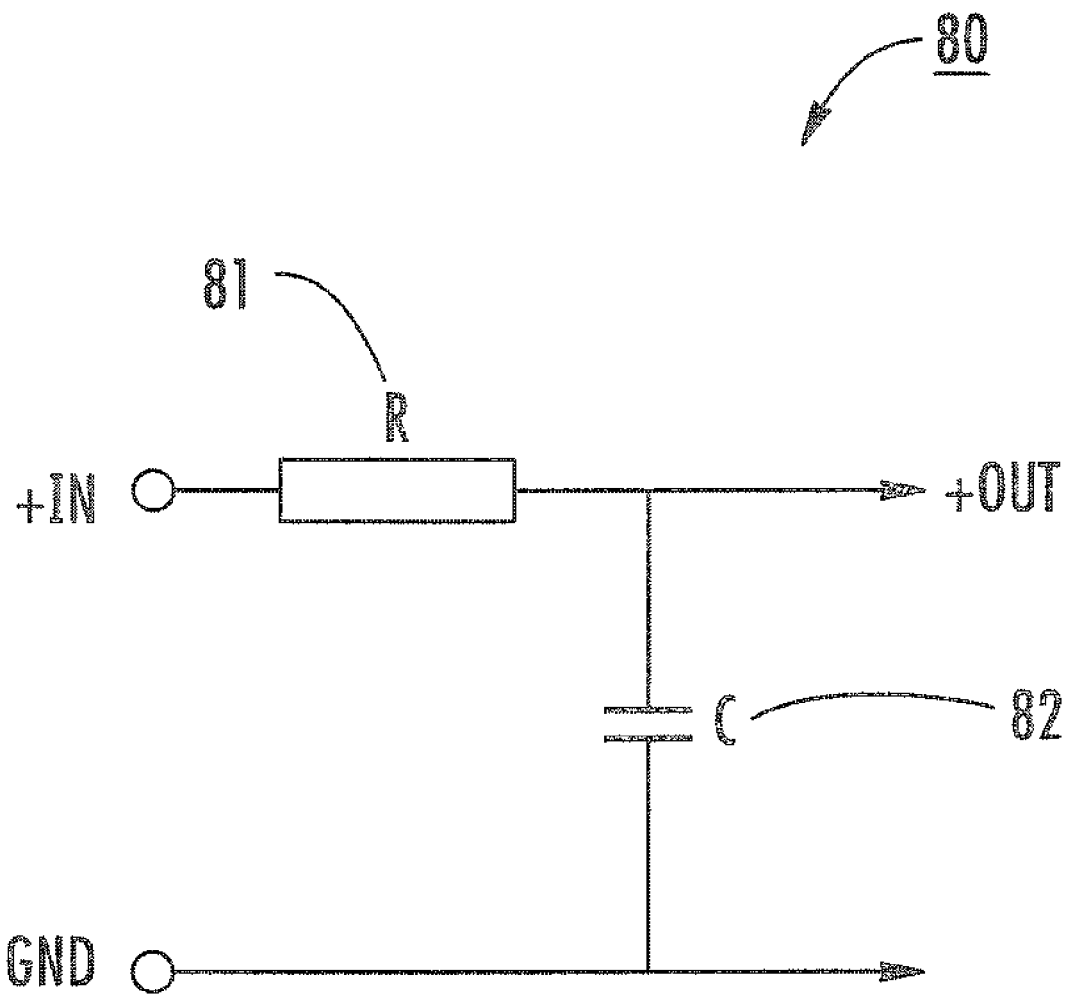
FIG. 5B is a circuit diagram for controlling a pulse output of a laser spot beam emitter according to embodiments of the present invention.

FIG. 5B illustrates an exemplary pulse control circuit 80 that can be configured to control laser pulse duration. In operation, current flow through the resistor 81 is not sufficient to power a laser spot beam emitter (20, FIGS. 3A, 3B). The capacitor 82 is charged through the resistor 81. When the capacitor 82 is charged, it can deliver sufficient energy for one short laser pulse. The next laser pulse cannot be emitted until the capacitor is sufficiently charged again, which will take a certain time depending on the time constant τ (which is dependent on the value of R and C) and the threshold voltage of the laser.

Figure 6:
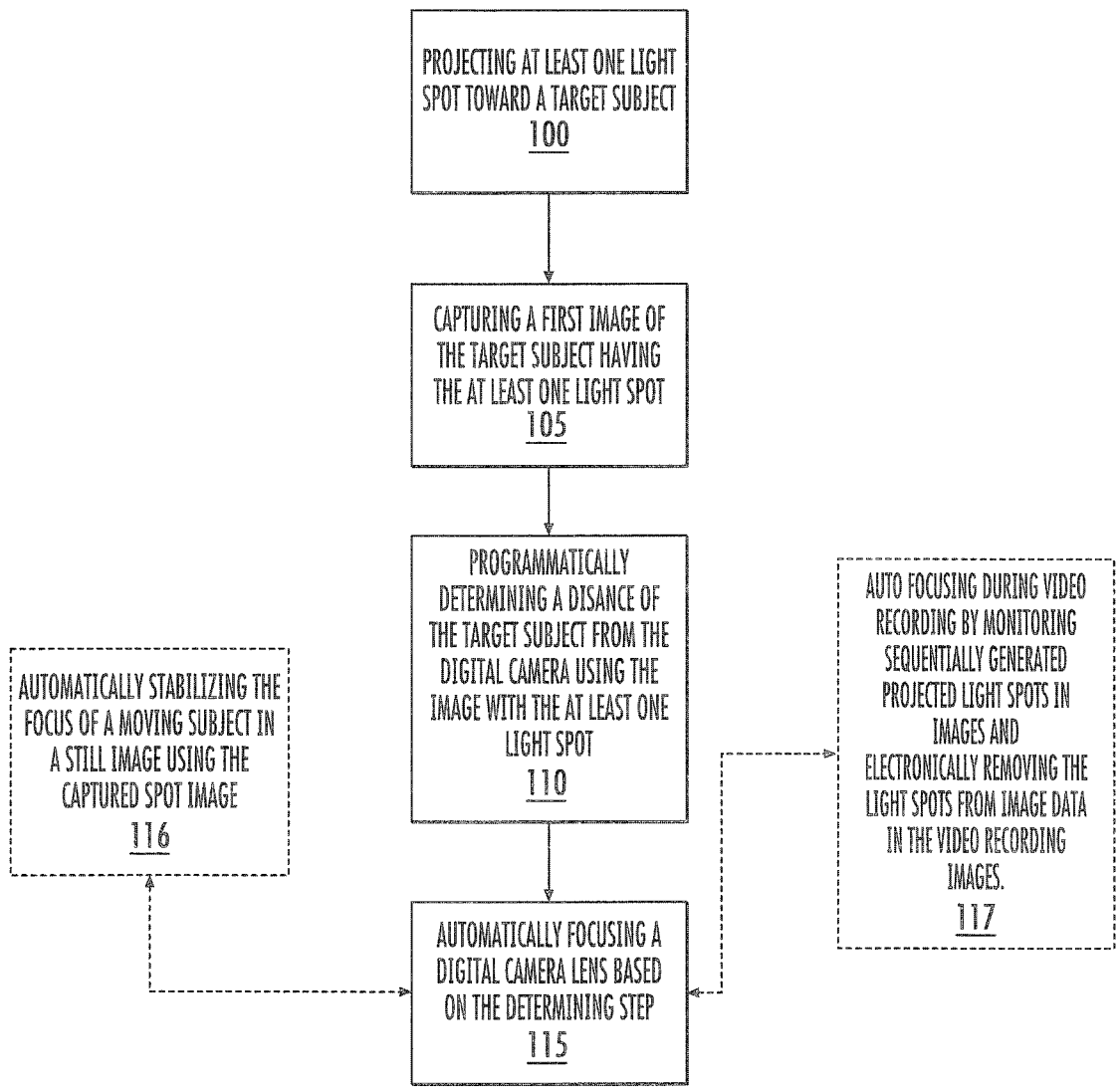
FIG. 6 is a flow chart of operations that can be used for auto focusing a digital camera according to embodiments of the present invention.

FIG. 6 illustrates exemplary operations that can be used to carry out auto focusing digital cameras according to embodiments of the present invention. At least one light spot is projected toward a target subject (block 100). A first image of the target subject having the at least one light spot is electronically captured (block 105). A distance of the target subject to the digital camera is programmatically determined using the image with the at least one light spot (block 110).

The digital camera lens is automatically focused based on the determined distance (block 115).

In some embodiments, the image of a moving subject may optionally be stabilized using the captured spot image (block 116). The stabilization process can correct for any misalignments caused by hand shake of the user or movements in the scene. Similarly, auto focusing during video recording can optionally comprise monitoring sequentially generated spot images and electronically removing light spots (such as by replacing or adjusting pixel values) from image data in the video recording spot images (block 117).

In some embodiments, the AF system can find the position of the spots in video recording images, because a spot can be visible every time an AF measurement is performed. Once the spots are recognized in the spot image(s) they can be removed by patching image data from the corresponding reference image(s). As such, the lens does not need to "hunt" for the best focus in video mode and tracking AF. The distance can be checked at regular intervals and a correction of focus can be made only when the system determines that new data is reliable and an adjustment is appropriate. Thus, the system can perform predictable AF when shooting still images or video sequences of moving objects. The motion of the moving object can be predicted based n a series of distance measurements.

Figure 7:
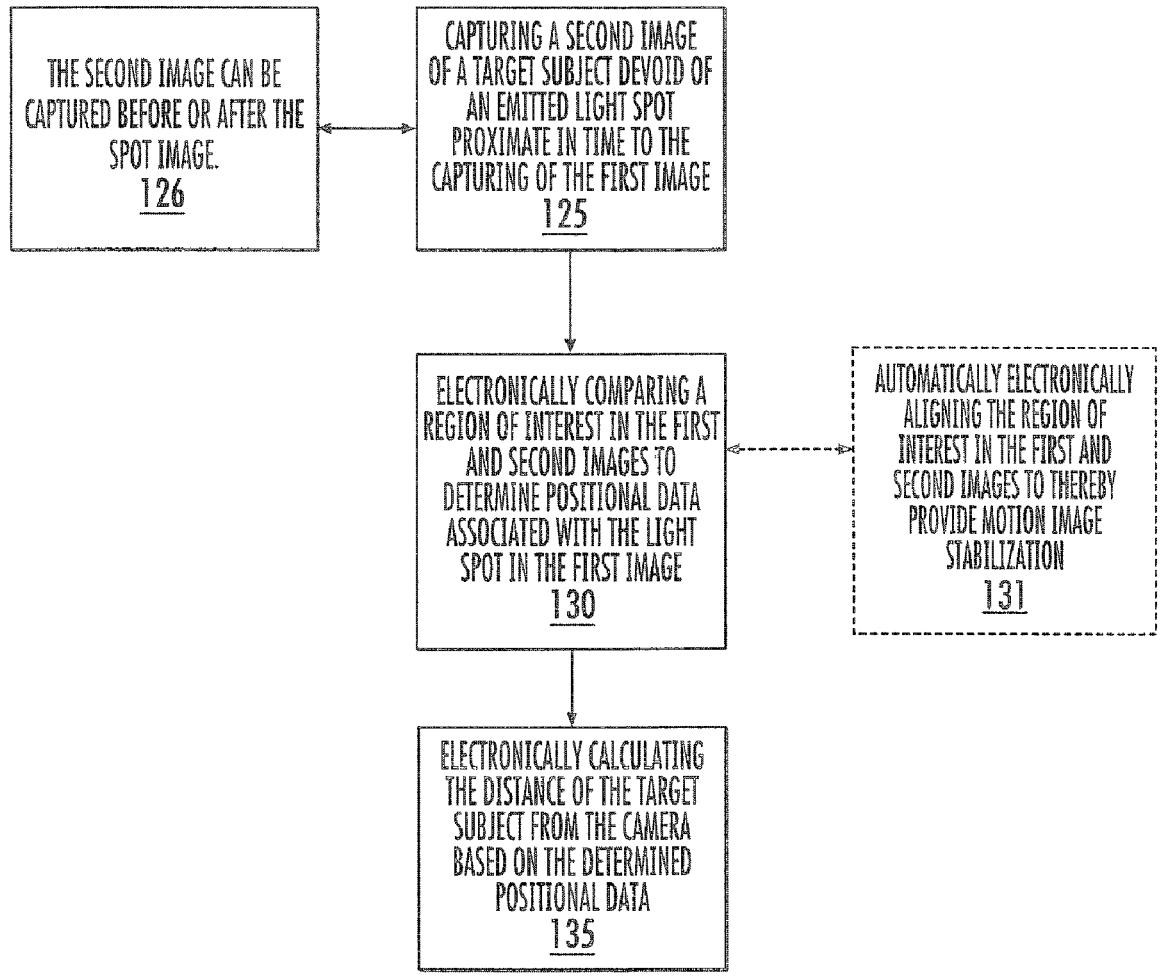
FIG. 7 is a flow chart of operations that can be used to for auto focusing a digital camera according to embodiments of the present invention.

FIG. 7 illustrates operations that may also be used to implement aspects of the invention. As shown, a second image of the target subject, this one without the emitted light spot, can be captured proximate in time to the capturing of the first image (block 125). The second image can be captured before or after the first spot image (block 126). The two images can be electronically compared to determine positional data associated with the light spot (block 130). The distance of the target subject from the camera can be calculated based on the determined positional data (block 135) as the position of the spot correlates to distance.

The comparison may optionally include automatically electronically registering (aligning) a region of interest in the first and second images to provide motion image stabilization, particularly in still images (block 131). The region of interest is less than the entire image and is typically a very small portion of the image that is sized to surround the spot zone(s).

Figure 8:
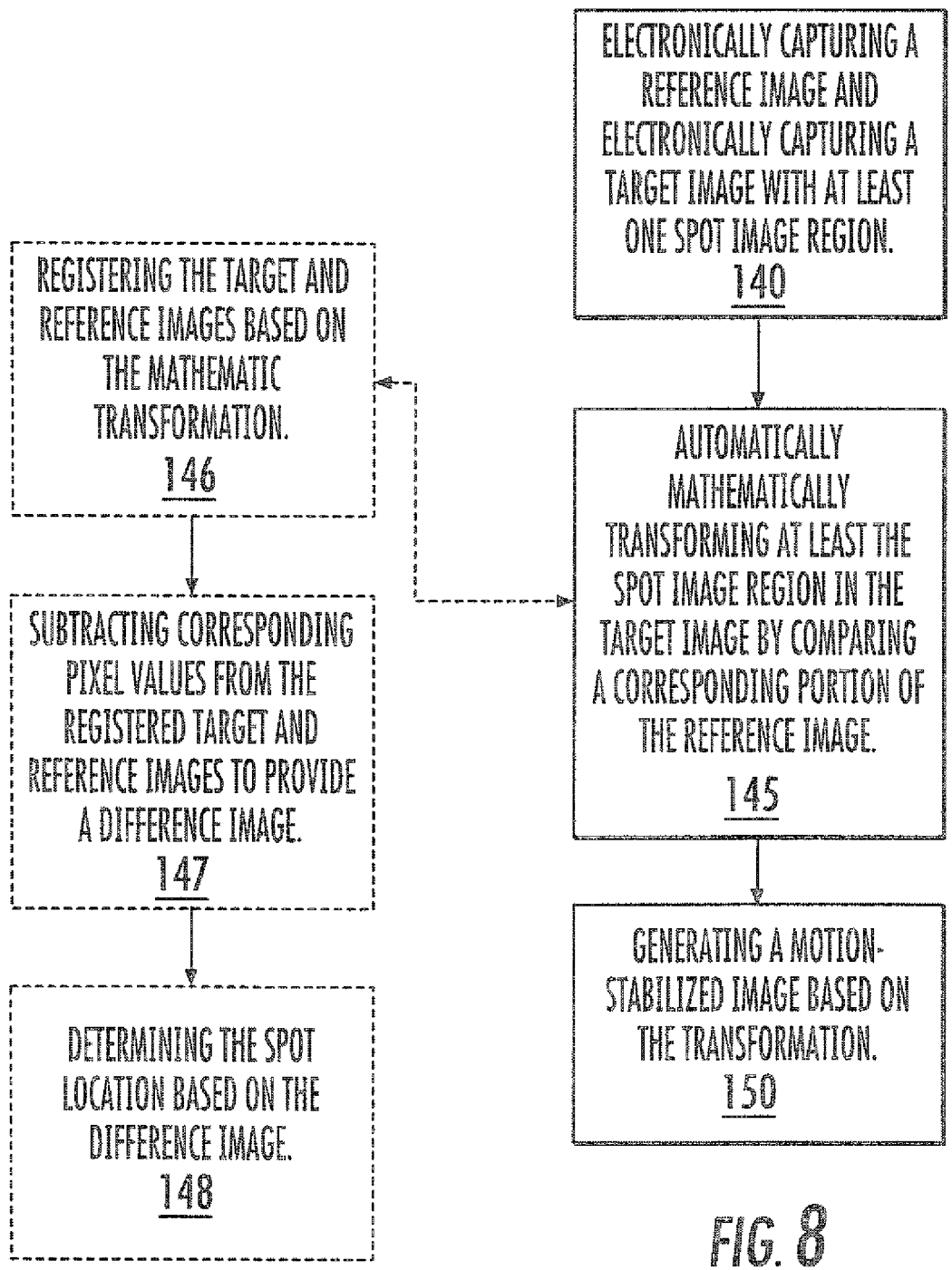
FIG. 8 is a flow chart of operations that can be used to carry out a method of auto focusing a digital camera with motion stabilization according to embodiments of the present invention.

FIG. 8 illustrates operations that can be used to electronically automatically provide a motion-stabilized still image. The operations may be used separately or in combination with other methods of the invention (as a motion-stabilization feature which does not require the use of triangulation AF systems). A reference image and a target image with at least one spot region are electronically captured (block 140). The spot image region in the target image is mathematically transformed by comparing a corresponding portion of the reference image (block 145). A motion-stabilized still image is generated based on the transformation (block 150).

In some embodiments, the target and reference images are registered based on the mathematic transformation (block 146). Values of corresponding pixels can be subtracted from the registered (aligned) target and reference images to provide a difference image (block 147). The spot location can be determined based on the difference image (block 148).

The transformation can shift the image horizontally and vertically as well as rotated while comparing the reference image using a correlation ratio algorithm. The correlation ratios for different transformations may be repeatedly calculated until the "optimal" or a sufficiently acceptable transformation is determined. Because the transformation is performed on a subset of the image, the difference between the images is expected to be relatively small.

Thus, in certain embodiments, when the two images are registered, their corresponding pixel values can be subtracted. The result is a difference image with the spot(s) against a dark background. Of course, the other contrasts can be used. The difference image can be generated using Equation (1).

$$Dn = Xn - Yn \qquad \text{Equation 1}$$

where "Dn" represents a single pixel value of the difference image between the corresponding pixel values of the spot image frame "Xn" and the reference image frame "Yn." Pixel values for different colors may be treated separately. For example, pixel values for red, green and blue colors can be treated separately. The calculation can be repeated for all pixels in the region of interest. Finding the spot position in the difference image may be more precise if the spot color is taken into account. A second difference image (D2) can be calculated using Equation (2), which assumes that the spot beam emitter is a red emitting light source (e.g., LED). The difference image D2 is a monochrome image. Alternative equations can be used to emphasize the color characteristic of the spot(s).

$$D2n = Xn[\text{red}] - Yn[\text{red}] \qquad \text{Equation 2}$$

where the pixel of D2 having the highest value corresponds to the spot position in the image.

The distance between the camera and the subject can be calculated. Equation 3 is an example of an equation that may be used to calculate the distance. The equation assumes that the axis of the camera lens is parallel to that of the emitter ray(s) or beam(s).

$$u = fs/np \qquad \text{Equation 3}$$

where, the displacement (n) refers to the difference in position between the spot image and the center of the image. The calculated subject to camera distance (u) depends also on the focal length of the camera lens (f), the distance between the camera lens and the emitter axis (s), the displacement of the spot measured in number of pixels (n), and pixel pitch (p).

It is believed that accuracy may be further improved by applying a polynomial function to the pixel values representing the spot image in the direction of interest, which may allow sub-pixel accuracy.

It will be appreciated that a spot signal may not be detectable when the distance to the subject is very long. The lens should be focused on the hyper focal distance in such a situation. This should be satisfactory because no signal response can be assumed to correlate to a very long distance. Alternatively, the contrast AF system may be employed in such a situation.

In a typical mobile phone camera having a focal length of 5 mm and an aperture of f1:2.8, distance information may only be appropriate in cases where the subject is located closer than about 3 meters (such as about 2.7 meters or closer). The calculated subject distance corresponds to a certain focusing position of the camera lens. The lens is moved to the correct position using the distance information. The triangulation method of determining distances is suitable for the auto-focusing of the digital camera lens.

Figure 9:
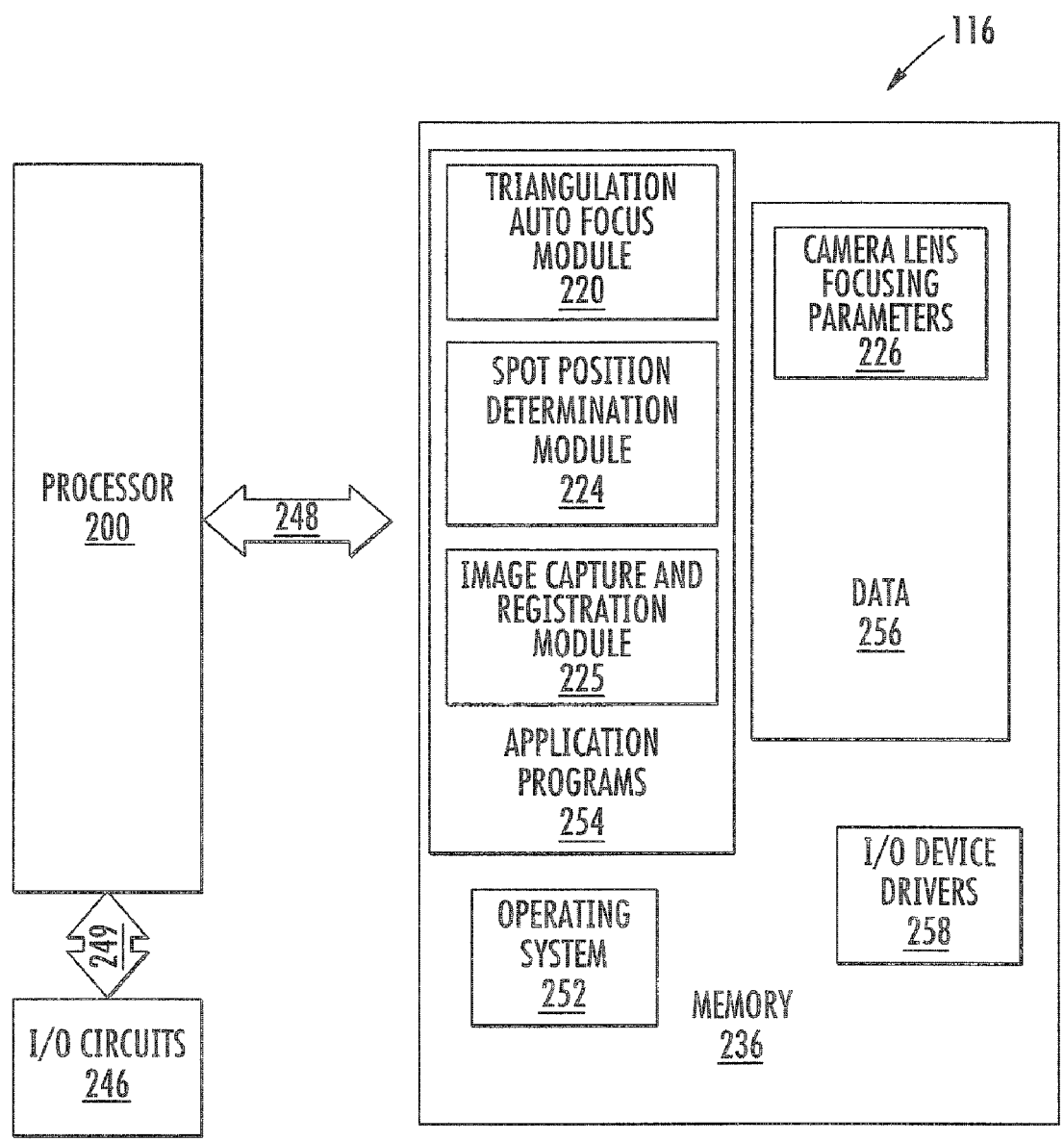
FIG. 9 is a block diagram of a data processing system according to embodiments of the present invention.

FIG. 9 illustrates an exemplary data processing system that may be included in devices operating in accordance with some embodiments of the present invention. As illustrated in FIG. 9, a data processing system, which can be used to carry out or direct operations includes a processor 200, a memory 236 and input/output circuits 246. The data processing system may be incorporated in the digital camera and/or portable communication device, or the like. The processor 200 communicates with the memory 236 via an address/data bus 248 and communicates with the input/output circuits 246 via an address/data bus 249. The input/output circuits 246 can be used to transfer information between the memory (memory and/or storage media) 236 and another component. These components may be conventional components such as those used in many conventional data processing systems, and/or image processing components, lens positioner, and the like, which may be configured to operate as described herein.

In particular, the processor 200 can be commercially available or custom microprocessor, microcontroller, digital signal processor or the like. The memory 236 may include any memory devices and/or storage media containing the software and data used to implement the functionality circuits or modules used in accordance with embodiments of the present invention, The memory 236 can include, but is not limited to, the following types of devices: cache, ROM, PROM, EPROM, EEPROM, flash memory, SRAM, DRAM and magnetic disk. In some embodiments of the present invention, the memory 236 may be a content addressable memory (CAM).

As further illustrated in FIG. 9, the memory (and/or storage media) 236 may include several categories of software and data used in the data processing system: an operating system 252; application programs 254; input/output device drivers 258; and data 256. As will be appreciated by those of skill in the art, the operating system 252 may be any operating system suitable for use with a data processing system, such as IBM®, OS/2®, AIX® or zOS® operating systems or Microsoft® Windows®95, Windows98, Windows2000 or WindowsXP operating systems Unix or Linux™. IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 258 typically include software routines accessed through the operating system 252 by the application program 254 to communicate with devices such as the input/output circuits 246 and certain memory 236 components. The application programs 254 are illustrative of the programs that implement the various features of the circuits and modules according to some embodiments of the present invention. Finally, the data 256 represents the static and dynamic data used by the application programs 254 the operating system 252 the input/output device drivers 258 and other software programs that may reside in the memory 236.

The data processing system 116 may include several modules, including a Triangulation AF module 220 (using a measure of distance to focus the lens), a spot position determination module 224, an image capture and registration module 225, and the like. The modules may be configured as a single module or additional modules otherwise configured to implement the operations described herein.

While the present invention is illustrated with reference to the application programs 220, 224, 225 in FIG. 9, as will be appreciated by those of skill in the art, other configurations fall within the scope of the present invention. For example, rather than being an application program 254 these circuits and modules may also be incorporated into the operating system 252 or other such logical division of the data processing system. Furthermore, while the application programs 220, 224, 234 in FIG. 9 are illustrated in a single data processing system, as will be appreciated by those of skill in the art, such functionality may be distributed across one or more data processing systems. Thus, the present invention should not be construed as limited to the configurations illustrated in FIG. 9, but may be provided by other arrangements and/or divisions of functions between data processing systems. For example, although FIG. 9 is illustrated as having various circuits and modules, one or more of these circuits or modules may be combined, or separated further, without departing from the scope of the present invention.

Figure 10A:
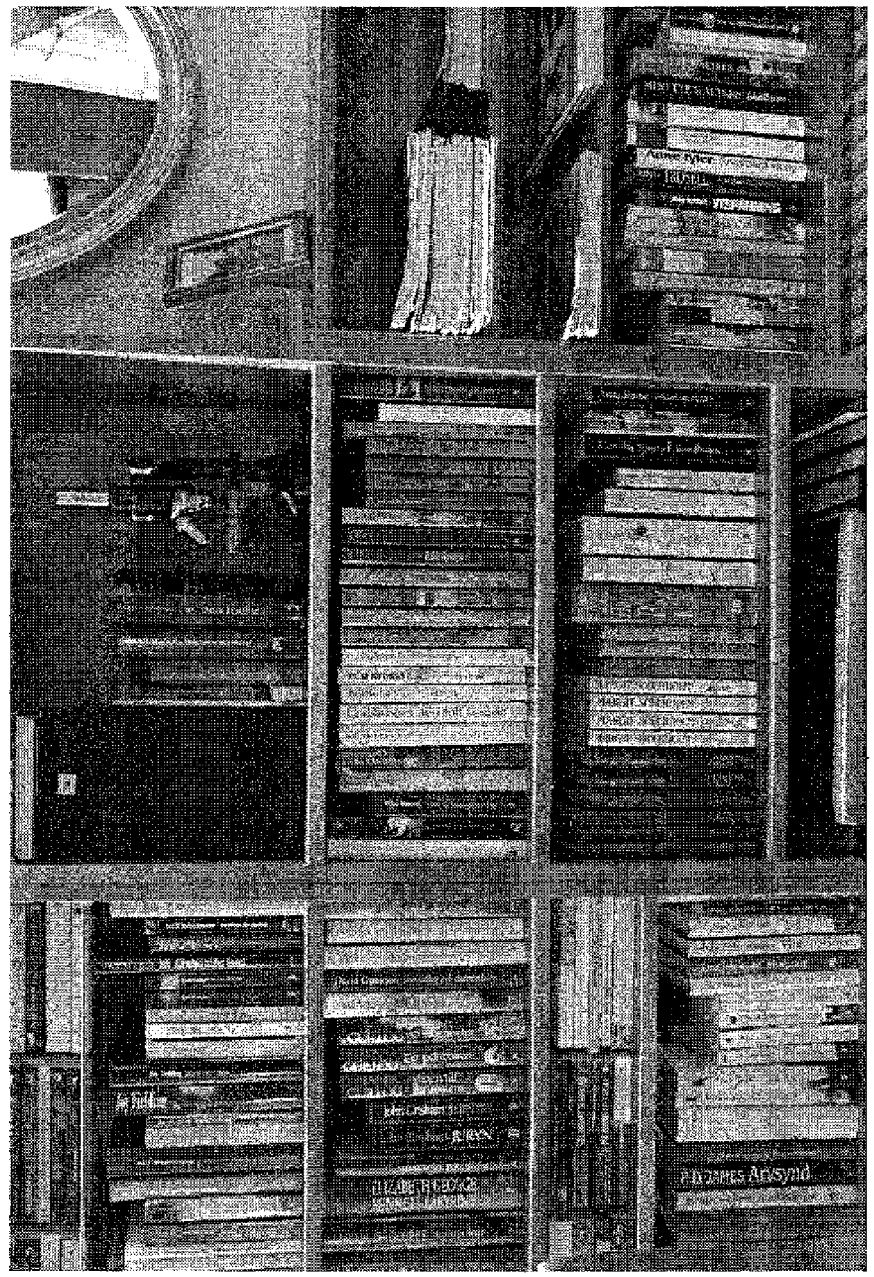

FIG. 10A is a digital reference image 300 of a target subject. FIG. 10B is a digital spot image 310 of the same target subject. Both images have the same size of 240 by 320 pixels (QVGA). In FIG. 10B, a small spot 311 generated by the spot beam emitter is visible at a generally medial location in the spot image 310.

Figure 11A:
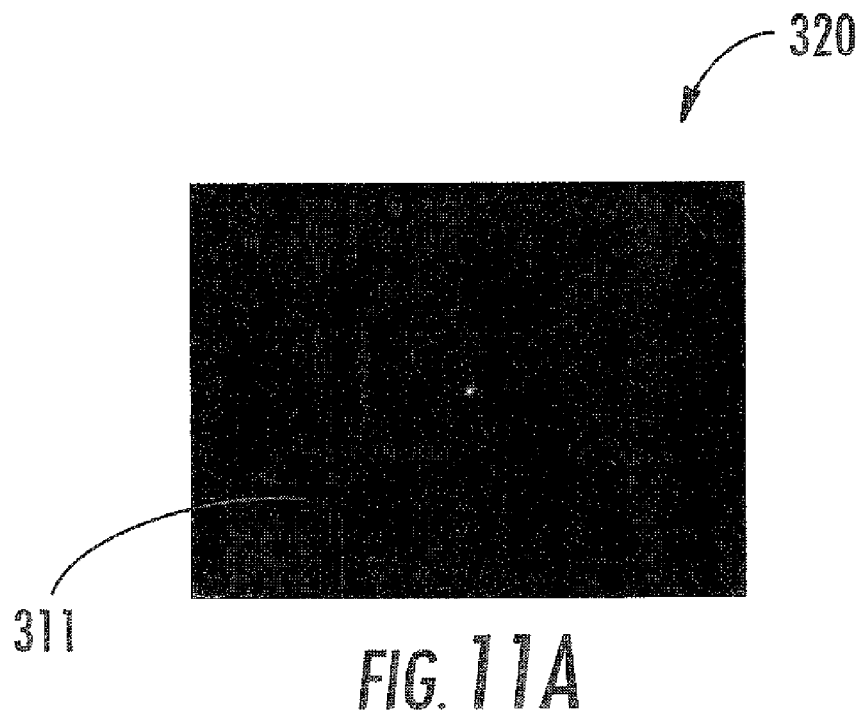
FIG. 11A is a difference image of the reference and spot images shown in FIGS. 10A and 10B according to embodiments of the present invention.
Figure 11B:
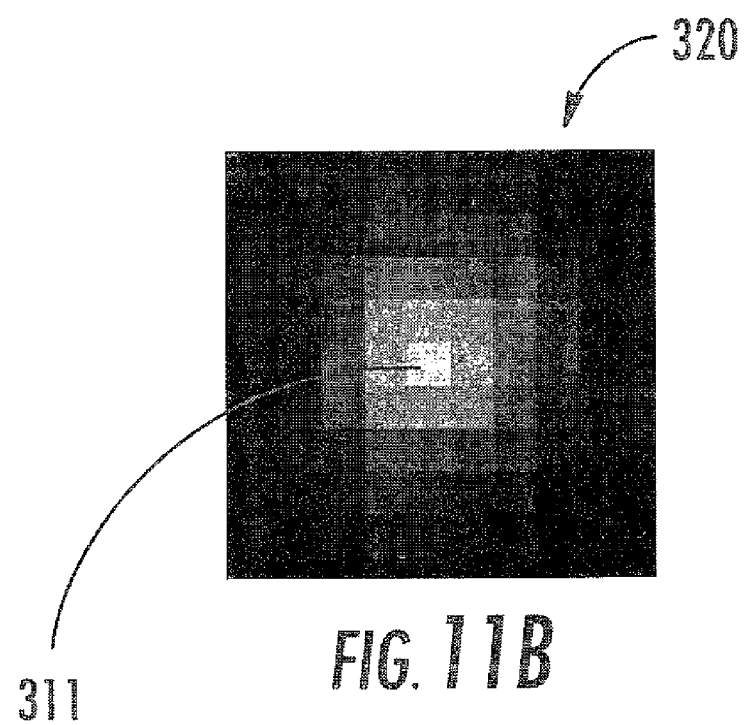
FIG. 11B is a greatly enlarged image of the spot area in the difference image shown in FIG. 11A according to embodiments of the present invention.

FIG. 11A is a difference image 320 of the spot image 310 and the reference image 300 shown in FIGS. 10B and 10A, respectively. FIG. 11B is a difference image with the spot area 311 magnified. The difference image 320 was processed using the images and a computer program using Equation (1). The triangulation AF algorithm works sufficiently well in QVGA resolution and can be used on viewfinder image data and does not require the camera to operate in high resolution mode.

Figure 12A:
FIG. 12A is a digital image of a target subject using a conventional contrast based AF system.

FIG. 12A is a digital image 400c taken using a conventional contrast based AF system that sometimes has difficulty focusing on the correct part of the image. In this example, the background contributes with more image detail than the bird in the foreground and the system can be fooled to focus on the background. Thus, focusing problems can arise when wide focusing is applied to contrast AF systems. As shown, for example, if the focusing area is covering a subject with sparse details in the foreground and the background contains a lot of details (such as a trees, wooded areas or a structure like a wall of a building), the contrast system may decide to focus on the background rather than the foreground.

Figure 12B:
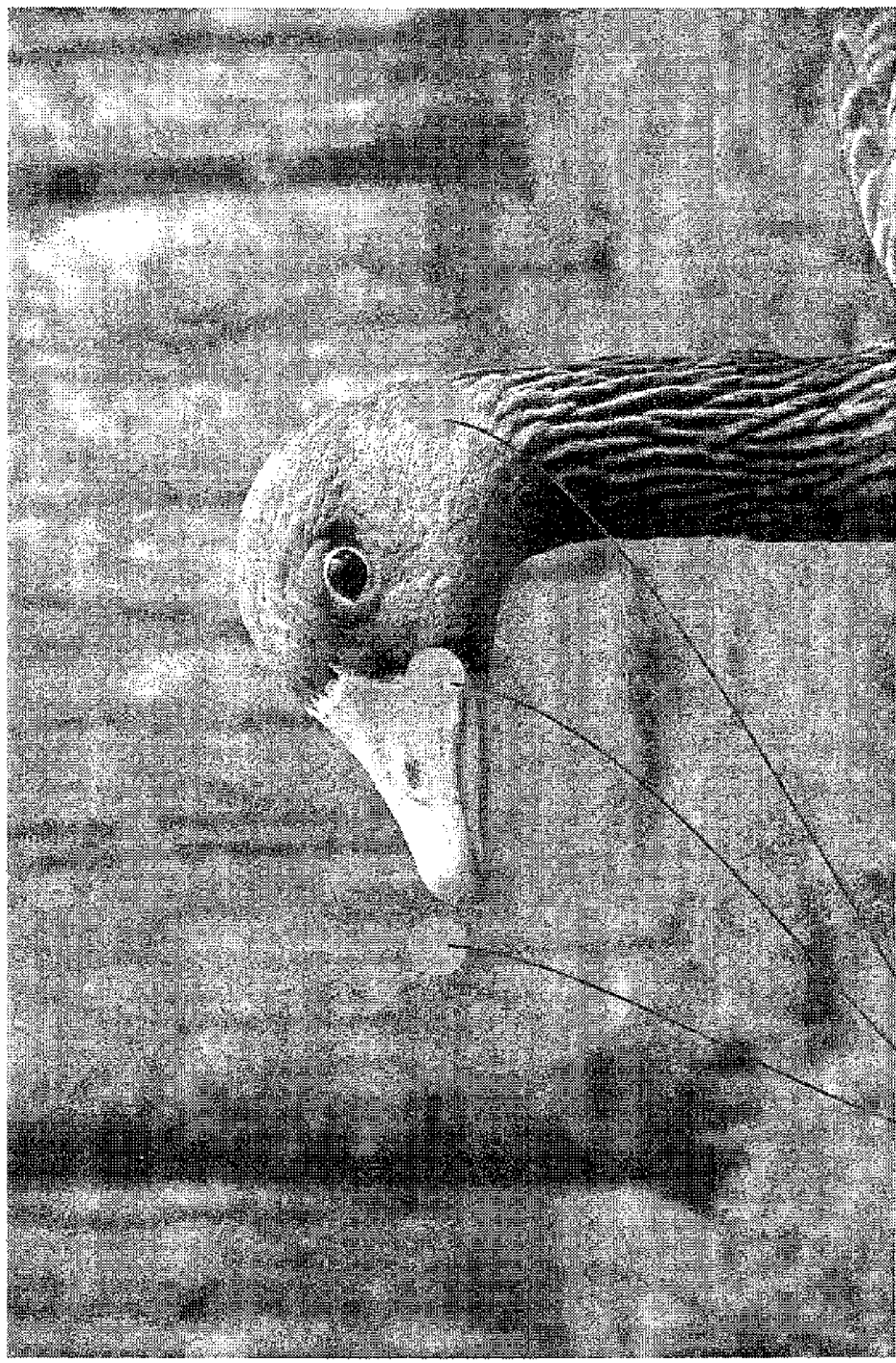
FIG. 12B is a digital image of the same target subject shown in FIG. 12A, but taken with a multi-spot triangulating AF system according to embodiments of the present invention.

FIG. 12B illustrates a digital spot image 400s taken using the triangulation AF system. The use of a multi-spot pattern can allow for relatively wide focusing using the triangular method and a plurality of spatially discrete spots 411 As shown, the spots (shown as three, but two, or four or more may be used) are horizontally spaced about the center of the image. Vertical or angular spot patterns may also be used. Thus, the image 400s can be segmented into multiple regions of interest, one for each spot in order to consider the multiple spots 411. Each region can be separately interrogated using the algorithms and equations described herein. A spot position for each spot 411 in each region of interest can be calculated. The spot position corresponding to the lowest distance value can be used for focusing as the assumption can be made that the part of the subject positioned closest to the camera is the part of the scene where the user most likely wants to focus.

The triangulation AF system can distinguish between the subject located at different distances. In this example, only the central and right spots will result in a detectable reflection, as the left spot is associated with a further spot having an increased distance value.

Zone focus scale and depth of field can be carried out using triangulation data. The method of controlling the focusing action of the lens in discrete steps as opposed to continuous movement is usually called "zone focusing". The zone focusing is based on the depth of field for the lens in use. A zone focusing scale can be calculated from a series of fractions of the hyper focal distance. The hyper focal distance is calculated using Equation 4.

$$h = f^2/NC \qquad \text{Equation 4}$$

where "h" is the hyper focal distance, f is the focal length of the lens, N is the lens aperture and C is the circle of confusion (maximum allowed blur circle).

Figure 13:
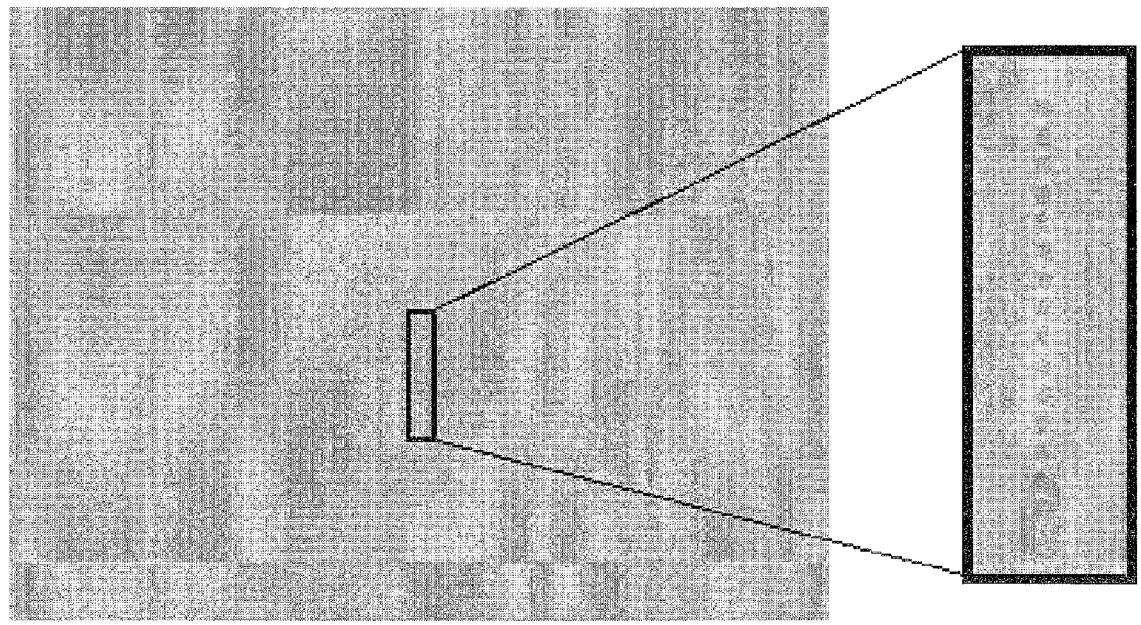
FIG. 13 is a QVGA-image with a plurality of spot positions which are enlarged for clarity in the extracted exploded portion shown to the right according to embodiments of the present invention.

FIG. 13 is an illustration of spot images in a QVGA image with an enlarged spot portion exploded to the right of the image. In this example, the location of the spot beam emitter is assumed to be located under the camera lens. Table 1 illustrates an example of a zone focusing scale and calculation of the pixel steps of spot position in the captured image shown in FIG. 13 are shown in Table 1. The distances FOCUS, CLOSE and FAR are given in meters. In this example, the spots are located at the same horizontal pixel (5), and vary in vertical distance with respect to center in steps of 3 pixels, from 1 to 43 pixels.

TABLE 1

Zone Focusing Table Using Spot Position

| Hyperfocal distance | FOCUS | CLOSE | FAR | PIXELS | STEP |
|---|---|---|---|---|---|
| h | 2.98 | 1.49 | INF | 1.5 | 3.0 |
| h/3 | 0.99 | 0.74 | 1.49 | 4.5 | 3.0 |
| h/5 | 0.60 | 0.50 | 0.74 | 7.5 | 3.0 |
| h/7 | 0.43 | 0.37 | 0.50 | 10.5 | 3.0 |
| h/9 | 0.33 | 0.30 | 0.37 | 13.5 | 3.0 |
| h/11 | 0.27 | 0.25 | 0.30 | 16.5 | 3.0 |
| h/13 | 0.23 | 0.21 | 0.25 | 19.5 | 3.0 |
| h/15 | 0.198 | 0.186 | 0.213 | 22.5 | 3.0 |
| h/17 | 0.175 | 0.165 | 0.186 | 25.5 | 3.0 |
| h/19 | 0.157 | 0.149 | 0.165 | 28.5 | 3.0 |
| h/21 | 0.142 | 0.135 | 0.149 | 31.5 | 3.0 |
| h/23 | 0.129 | 0.124 | 0.135 | 34.5 | 3.0 |
| h/25 | 0.119 | 0.114 | 0.124 | 37.5 | 3.0 |
| h/27 | 0.110 | 0.106 | 0.114 | 40.5 | 3.0 |
| h/29 | 0.103 | 0.099 | 0.106 | 43.5 | |

Table 1 illustrates the relationship between the mathematics of focusing and triangulation. A zone focusing scale is constructed from the hyper focal distance. A lens that is focused at the hyper focal distance will have a depth of field ranging from h/2 to infinity. The following steps of the scale are constructed by dividing "h" with odd integers. Any step in the scale will have a depth of field reaching between the next and previous steps. The column "PIXELS" shows how many pixels from the center of the image the spot will be visible at the given distance. The column "STEP" shows how many pixels there are between the next and previous steps. The example is based on a digital camera having lens with the focal length of 5 mm and speed 1:2,8. The camera sensor is a 2 million pixel-array with a pixel pitch of 3 μm. The spot is detected in the viewfinder image having the resolution of 240×320 (QVGA). The distance between the camera lens axis and the spot beam axis is 13, 67 mm in this example. The steps between the spot positions measured in pixels are equidistant making the construction and mathematical implementation relatively straightforward. The step resolution of 3 pixels provides sufficient resolution for this example.

FIG. 14 is an exemplary source code listing that can be used to carry out operations according to some embodiments of the present invention. This example of code does not include image registration. It is noted again that only the region/regions of interest are searched/interrogated. The code is configured to subtract the reference image from the spot image to determine the position of the spot.

In summary, some embodiments of the present invention can provide one or more of increased auto focusing speed, image stabilization, can operate in total darkness, can make continuous tracking AF possible, can improve focusing precision, can reduce cost over conventional triangulation systems, can be implemented in relatively small size.

The present invention may also be embodied in other types of mobile electronic apparatus that include a camera without departing from the scope of the present invention. For example, the mobile electronic apparatus may include a RF radio and a camera, and/or it may include a mobile communication terminal such as a satellite or cellular radiotelephone and a camera device. The camera phone may be configured to transmit pictures over a wireless interface, such as a cellular RF interface, and may display the pictures on a display. The camera phone may also be configured to generate an audio signal from communication signals that are received over a wireless interface. The transmission of digital pictures and generation of audio signals from received communication signal may be carried out by the camera phone in a conventional manner.

Many variations and modifications can be made to the preferred embodiments without substantially departing from the principles of the present invention. Accordingly, all such variations and/or modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of auto-focusing a digital camera in still image and/or video recording mode, comprising:
    projecting a plurality of discrete light spots toward a target subject using the digital camera;
    capturing a first viewfinder image of the target subject with the projected light spots in response to the projecting step;
    programmatically calculating a triangulation measure of distance for each of a plurality of the projected light spots in the first viewfinder image; and
    automatically focusing a digital camera lens associated with the digital camera using a closest one of the calculated triangulation measure of distances.

2. The method of claim 1, further comprising:
    capturing a second reference image of the target subject without projected light spots proximate in time to the capturing of the first viewfinder image;
    electronically registering the first and second images;
    electronically generating a difference image of pixel values obtained by subtracting pixel values from the registered first and second images; and
    electronically identifying light spot locations associated with the projected light spots in the difference image,
    wherein the programmatically calculating step uses the identified spot locations in the difference image to calculate the triangulation measures of distance.

3. The method of claim 2, wherein the electronically identifying step uses pixel color to identify spot location.

4. The method of claim 2, wherein the digital camera is held in a cellular telephone and comprises a circuit configured to capture the first and second images within less than about 0.067 seconds of each other, and wherein the auto-focusing step is configured to move the lens to a focused position within about 0.033 seconds after the first image is obtained to carry out the automatically focusing step.

5. The method of claim 1, wherein during the video recording mode, the method further comprises electronically patching light spots in video recording images using pixel data from corresponding locations in at least one reference viewfinder image that is devoid of light spots during video streaming to provide video recording images without light spots.

6. The method of claim 1, wherein the auto focusing step uses a camera to subject distance "u" that is calculated according to:

$$u = fs/np$$

where "n" represents a displacement measured in number of pixels in position between a light spot in the image and a center of the image, "f" is a focal length of the camera lens, "s" is a distance between the camera lens and an emitter axis for emitter(s) used to generate the projected light spots, and "p" is pixel pitch.

7. The method of claim 1, wherein the projecting step comprises emitting light from a light source in a visible part of a light spectrum.

8. The method of claim 2, wherein the capturing the first and second image steps are carried out using the same exposure setting and the same white balance setting.

9. The method of claim 1, wherein the projecting the light spots step is carried out by substantially concurrently projecting a plurality of discrete horizontally spaced apart spots.

10. The method of claim 2, further comprising automatically electronically correlating a region of interest in the first and second images to thereby provide image stabilization.

11. A method of auto-focusing a digital camera in a cellular telephone in still image and/or video recording mode, comprising:
projecting a plurality of spatially discrete light spots toward a target subject using the cellular telephone digital camera in a viewfinder mode;
capturing a viewfinder image of the target subject having light spots in response to the projecting step;
programmatically determining spot positions in the image;
calculating a triangulation measure of distance for each of at least a plurality of the light spots in the image;
selecting a focus distance for the camera based on a closest calculated spot distance; and
automatically focusing a digital camera lens in the cellular telephone digital camera using the selected focus distance to obtain a second image.

12. The method of claim 11, wherein the selecting step selects the focus distance from a correlation table defining different focal lengths relative to pixel location of a light spot associated with the closest spot distance in the spot image.

13. The method of claim 11, further comprising:
registering the viewfinder and second images; and
electronically subtracting corresponding pixel values in the images to generate a difference image with the spots against a dark background.

14. The method of claim 13, wherein the electronically subtracting step is repeated for all pixels in a region of interest.

15. The method of claim 13, wherein the electronically subtracting step is configured to consider pixels of different colors.

16. The method of claim 11, wherein, in the video recording mode, the method is carried out by substantially continuously repeating the steps of projecting, capturing, determining and automatically focusing, and wherein the method further comprises:
electronically patching light spots in video recording images with pixels from corresponding spot locations in at least one reference viewfinder image, the at least one reference image being devoid of light spots to thereby provide video recording images without light spots.

17. A method of auto-focusing a digital camera having a lens in a cellular telephone in still image and/or video recording mode, comprising:
(a) projecting a plurality of spatially discrete light spots toward a target subject using the cellular telephone digital camera;
(b) capturing a first image of the target subject having the light spots in response to the projecting step;
(c) electronically calculating a triangulation measure of distance for each of a plurality of the light spots in the captured first image; and
(d) programmatically focusing the camera using a focus distance of the target subject based on the triangulation measure of distance having a lowest distance value.

18. A method according to claim 17, wherein the capturing step is carried out with QVGA resolution in viewfinder mode.

19. A method according to claim 17, wherein the programmatically focusing step is carried out using a camera to subject distance "u" that is calculated according to:

$$u = fs/np$$

where "n" represents a displacement measured in number of pixels in position between the spot in the image and a center of the image, "f" is a focal length of the camera lens, "s" is a distance between the camera lens and an emitter axis for emitter(s) used to generate the projected light spots, and "p" is pixel pitch.

20. A method according to claim 17, wherein the electronically calculating step comprises applying a polynomial function to pixel values representing the spot image in a direction of interest.

21. A method according to claim 17, further comprising video recording images using the cellular telephone camera while repeating steps (a)-(d), wherein the method further comprises:
electronically patching light spots in video recording images using pixel data from at least one reference viewfinder image that is devoid of light spots during video streaming to provide video recording images without light spots.

* * * * *